US007826233B2

(12) United States Patent
Connor et al.

(10) Patent No.: US 7,826,233 B2
(45) Date of Patent: Nov. 2, 2010

(54) CASSETTE MATRIX FOR AN ELECTRICAL SWITCHING APPARATUS

(75) Inventors: Lawrence T. Connor, Venetia, PA (US); Frankie K. Ostrowski, Natrona Heights, PA (US); Raymond P. Gundy, II, Indiana, PA (US); Aaron T. Kozar, Zelienople, PA (US)

(73) Assignee: Eaton Corporation, Cleveland, OH (US)

( * ) Notice: Subject to any disclaimer, the term of this patent is extended or adjusted under 35 U.S.C. 154(b) by 815 days.

(21) Appl. No.: 11/744,525

(22) Filed: May 4, 2007

(65) Prior Publication Data

US 2008/0259534 A1 Oct. 23, 2008

Related U.S. Application Data

(63) Continuation-in-part of application No. 11/736,746, filed on Apr. 18, 2007.

(51) Int. Cl.
*H05K 7/14* (2006.01)

(52) U.S. Cl. .................. 361/802; 361/741; 361/756; 361/796

(58) Field of Classification Search ......... 361/728–731, 361/756, 741, 796, 802, 828, 832, 833, 837
See application file for complete search history.

(56) References Cited

U.S. PATENT DOCUMENTS

| 5,332,306 | A | * | 7/1994 | Babb et al. | ............ 312/334.16 |
| 5,559,678 | A | * | 9/1996 | Fukuda et al. | ............ 361/818 |
| 5,912,799 | A | * | 6/1999 | Grouell et al. | ......... 361/679.32 |
| 6,038,126 | A | * | 3/2000 | Weng | .................... 361/679.01 |
| 6,070,742 | A | | 6/2000 | McAnally et al. | |
| 6,242,534 | B1 | | 6/2001 | Obrecht et al. | |
| 6,246,580 | B1 | * | 6/2001 | Weng | ....................... 361/695 |
| 6,381,149 | B1 | | 4/2002 | Megason et al. | |
| 6,421,252 | B1 | * | 7/2002 | White et al. | ................. 361/797 |
| 6,547,081 | B1 | * | 4/2003 | Kaminski | ..................... 211/26 |
| 6,554,142 | B2 | | 4/2003 | Gray | |
| 6,588,866 | B2 | | 7/2003 | Cheng | |
| 6,600,648 | B2 | | 7/2003 | Curlee et al. | |
| 6,601,713 | B2 | * | 8/2003 | Kaminski | ..................... 211/26 |
| 6,735,091 | B2 | | 5/2004 | Megason et al. | |
| 7,324,349 | B2 | * | 1/2008 | Wobig et al. | ................ 361/756 |
| 7,414,856 | B2 | * | 8/2008 | Sandgren et al. | ............ 361/756 |
| 7,542,296 | B1 | * | 6/2009 | Baik et al. | .................. 361/730 |
| 7,558,074 | B2 | * | 7/2009 | Liang | ........................ 361/796 |

* cited by examiner

*Primary Examiner*—Dameon E Levi
(74) *Attorney, Agent, or Firm*—Martin J. Moran

(57) ABSTRACT

A cassette matrix having a first cassette and a second cassette disposed immediately adjacent to each other is provided. The outer sides of the cassettes are in contact and there are no fastener components, such as, but not limited to, a bolt head or nut, disposed between adjacent sidewalls. In this configuration, the cassette matrix requires a reduced amount of space within a larger housing assembly. Each cassette utilizes threshold mounting fasteners to coupled any components to the lateral sidewall. A threshold mounting fastener does not extend outwardly beyond the general plane of the lateral sidewall.

6 Claims, 1 Drawing Sheet

CASSETTE MATRIX FOR AN ELECTRICAL SWITCHING APPARATUS

CROSS REFERENCE TO RELATED APPLICATION

This application is a continuation-in-part application that claims priority under 35 U.S.C. §119(e) to U.S. patent application Ser. No. 11/736,746, filed Apr. 18, 2007 entitled, SUPPORT AND EXTENSION RAIL ASSEMBLY.

BACKGROUND OF THE INVENTION

1. Field of the Invention

This invention relates to a housing assembly for an electrical switching apparatus and, more specifically, to a housing assembly having no protrusions extending outwardly from the lateral sides.

2. Background Information

An electrical switching apparatus is typically disposed in a housing assembly. The housing assembly is, typically, a rectangular box having a back sidewall, a top sidewall, a bottom sidewall, a right sidewall, a left sidewall, and a front sidewall. Selected sidewalls, typically the back sidewall or the top and bottom sidewalls, have openings therethrough which are structured to accommodate the line and load conductors for the electrical switching apparatus. The front sidewall may be movable, or removable, so as to allow access to the enclosed space defined by the housing assembly. An electrical switching apparatus may be disposed in the enclosed space defined by the housing assembly and coupled to the line and load conductors. Often a plurality of electrical switching apparatuses will be disposed within a single housing assembly. Other times individual electrical switching apparatuses will be disposed within a sub-housing assembly, also called a cassette, within a larger housing assembly.

Within a cassette there are a number of components that are coupled to the cassette walls. For example, certain types of electrical switching apparatus have a considerable weight and are typically moved into and out of the cassette on a pair of tracks or rails. The fasteners for the rails typically extend through the rail assembly and through a lateral wall. The fastener, which is typically a bolt, has an associated capture device, i.e. a nut. In this configuration, the bolt head or the nut is disposed on the outer side of the cassette. Other fasteners also extend through the lateral sides of the cassette. For example, the cassette is typically constructed from generally flat sheets of metal. The edges of selected sidewalls, the lateral edges of the bottom sidewall for example, may be bent to about a right angle thereby creating a mounting tab. The mounting tab and the associated lateral sidewall will have a fastener opening therethrough. When a fastener, again a bolt/nut is typical, is inserted into the opening, either the bolt head or the nut will be disposed on the outer side of the lateral sidewall.

When the cassette is used independently, having fasteners disposed on the outer side of the lateral sidewall is acceptable; however, when multiple cassettes are disposed in a larger housing assembly side-by-side, the fasteners disposed on the outer side of the lateral sidewall are difficult to access and require extra space. That is, two cassettes cannot be placed immediately adjacent to each other because of the exposed fasteners. Also, when such cassettes are placed as close together as possible, it is very difficult to access the fasteners disposed between the cassettes. Thus, a simple repair procedure may require the removal of both enclosed electrical switching apparatuses so that the cassettes may be broken down for repair. Where cassettes are disposed vertically, the same problems may be seen with fasteners extending through the top and bottom sidewalls. Further, while fasteners disposed through other sidewalls, e.g. the back sidewall, where the bus assembly is typically located, do not generally cause interference problems, these fasteners may still be difficult to reach.

One method of addressing these problems is to have fasteners extend through adjacent lateral sidewalls. That is, a single fastener may be passed through a rail assembly in a first cassette, the sidewall of the first cassette, the sidewall of an adjacent cassette, and the rail assembly of the adjacent cassette. This configuration is also not optimal, however, as both cassettes must have the enclosed electrical switching apparatus removed to repair, for example, a single rail assembly.

There is, therefore, a need for a cassette for an electrical switching apparatus that may be disposed immediately adjacent to another laterally disposed cassette.

There is a further need for a cassette for an electrical switching apparatus wherein all attachment hardware may be accessed from inside the enclosed space.

SUMMARY OF THE INVENTION

These needs, and others, are met by at least one embodiment of the present invention which provides a cassette matrix having a first cassette and a second cassette disposed immediately adjacent to each other. That is, the outer sides of the cassettes are in contact and there is no fastener components, such as, but not limited to, a bolt head or nut, disposed between adjacent lateral sidewalls. In this configuration, the cassette matrix requires a reduced amount of space within a larger housing assembly. Each cassette utilizes threshold mounting fasteners to couple any components to the lateral sidewall. A threshold mounting fastener does not extend outwardly beyond the general plane of the lateral sidewall. Further, any other component mounting hardware also does not extend outwardly beyond the general plane of the lateral sidewall. Thus, the cassettes may be disposed immediately adjacent to each other.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
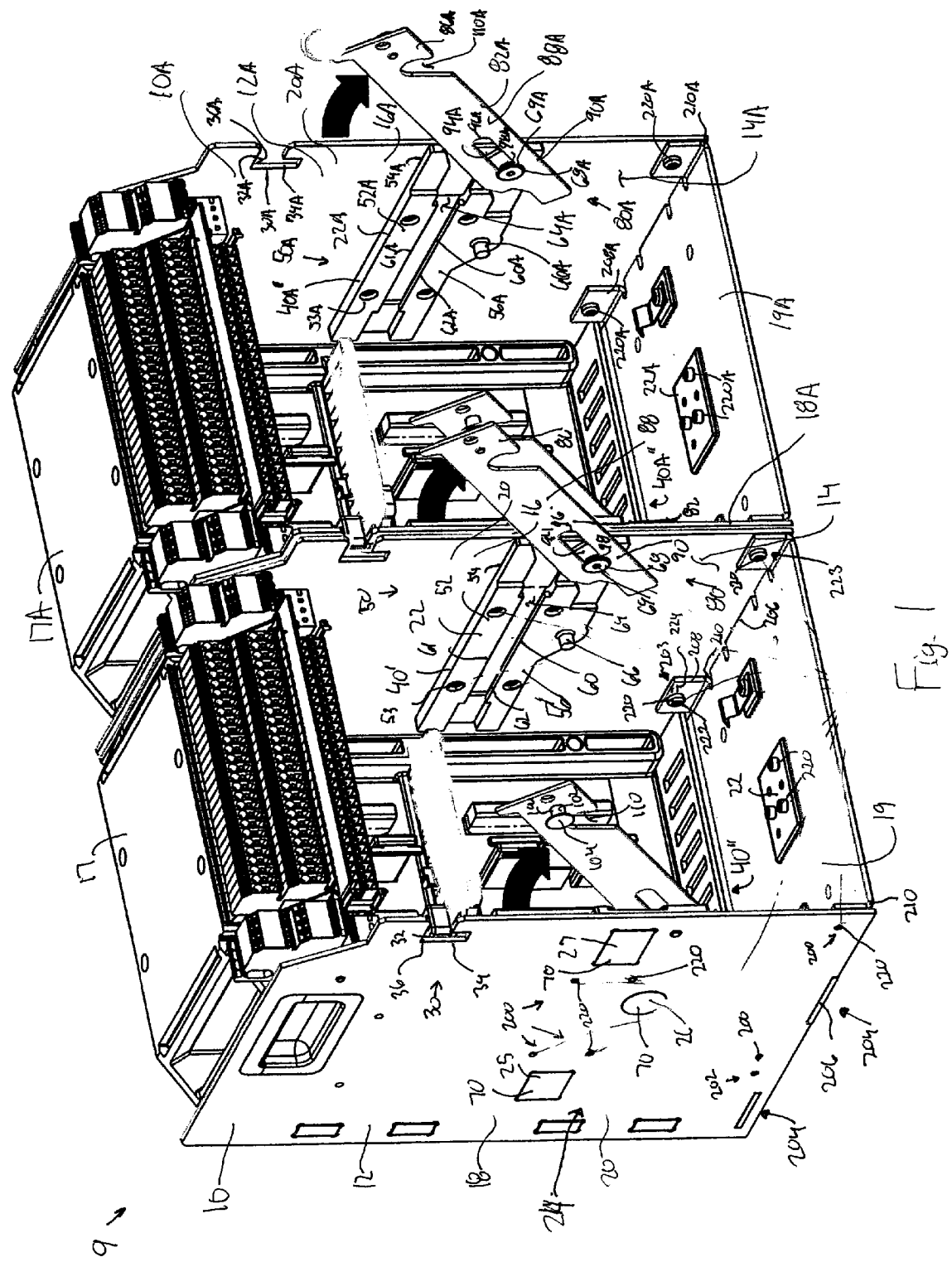
FIG. 1 is an isometric view of two cassettes disposed immediately adjacent to each other.

As used herein, directional words and phrases, such as, but not limited to, "upper," lower," "interior," and "exterior" relate to a housing assembly as shown in the figures. For example, a plate disposed entirely with the housing assembly may have an "exterior surface" which is the surface that is closest to the outside of the housing assembly.

As used herein, the word "unitary" means a component created as a single piece or unit. That is, a component that includes pieces that are created separately and then coupled together as a unit is not a "unitary" component or body.

As used herein, a "threshold mounting fastener" is a fastener having a head and a shaft wherein the shaft has a limited length. The length of the shaft is related to the thickness of the component the threshold mounting fastener passes through so that the distal end of the fastener, that is, the end opposite the head of the fastener, does not extend through the mounting substrate. By way of a non-limiting example, if a substrate is 0.125 inch thick and a component being coupled to the substrate is 0.5 inch thick, a threshold mounting fastener will have a shaft that is no longer than 0.625 inch.

FIG. 1 shows a cassette matrix 9 having a first cassette and a second cassette 10, 10A, disposed immediately adjacent to each other. That is, the outer sides of the cassettes 10, 10A are in contact and there is no fastener components, such as, but not limited to, a bolt head or nut, disposed therebetween. The following description shall address the first cassette 10, however, it is understood that the same descriptions are applicable to the second cassette. Further, reference numbers for the first cassette 10 are also applicable to the second cassette 10A but will be followed by the letter "A." The cassette 10 is structured to enclose an electrical switching apparatus (not shown). The cassette 10 includes a plurality of sidewalls 12 defining an enclosed space 14. Typically, the plurality of sidewalls 12 include six sidewalls disposed in a rectangular box-like configuration. It is noted that a front sidewall, which may be a door or a removable sidewall, is not shown. The front sidewall may also be incorporated into a larger housing assembly (not shown) that encloses multiple cassettes 10, 10A. Such a front sidewall is well known in the art. Preferably, the cassette 10 has a right sidewall 16, a top sidewall 17, a left sidewall 18, and a bottom sidewall 19.

Each sidewall 12 is structured to support at least one component 22. For example, each lateral sidewall 16, 18 is structured to support a support rail and extension rail assembly 40. A support rail and extension rail assembly 40 includes two mirror image components 22. That is, a first support rail and extension rail assembly 40' is coupled to the cassette right sidewall 16 and a second support rail and extension rail assembly 40" is coupled to the cassette left sidewall 18. The first support rail and extension rail assembly 40' and the second support rail and extension rail assembly 40" are positioned at generally the same vertical location within the first cassette 10. Similarly, the right sidewall 16 and left sidewall 18 are, generally, mirror images of each other. Accordingly, the following description shall address a single lateral sidewall 12 of the cassette 10 and the associated support rail and extension rail assembly 40', however, it is understood that a second, mirror image support rail and extension rail assembly 40" coupled to a mirror image sidewall 12 is also part of the invention. In the figures, those components 22 associated with the first support rail and extension rail assembly 40' and the cassette right sidewall 16 shall be followed by a single prime symbol while the second support rail and extension rail assembly 40" and the cassette left sidewall 18 shall be followed by a double prime symbol. It is further understood that similar reference numbers refer to similar components 22 on opposing assemblies.

As shown, a lateral sidewall 16, 18 includes a generally flat body 20 having a plurality of openings 200 therethrough which are discussed in detail below. The bottom sidewall 19 may also includes a plurality of openings 200 as well. The plurality of openings 200 includes a number of fastener openings 202 and slots 204 typically structured to couple the housing assembly sidewalls 12 to each other. That is, as shown, after the cassette 10 is assembled the bottom sidewall 19 has a width "W." This width is the width between the associated right and left sidewalls 16, 18. Prior to construction, the lateral edges of the bottom sidewall 19 have a width greater than the final width W. The portions of the bottom sidewall 19 having a width greater than the final width W are preferably lateral, tab-like extensions 206, 208. The extensions may be either at least one short extension 206 and/or at least one long extension 208. A short extension 206 is structured to fit within a slot 204 and has a length in the lateral direction corresponding to the thickness of the associated right or left sidewalls 16, 18. Thus, when a short extension 206 is inserted into a slot 204, the distal edge of the short extension 206 is generally flush with the plane of the associated right or left sidewalls 16, 18. A long extension 208 is bent to about a right angle. The bend 210 is disposed at a location corresponding to the final width W of the bottom sidewall 19. The long extension 208 has a passage 203 therethrough. The long extension passage 203 is sized to not be engaged by threshold mounting fasteners 220, discussed below.

The plurality of openings 200 further includes a plurality of mounting openings 24. Preferably, there are three mounting openings 25, 26, 27. The mounting openings 25, 26, 27 have a larger cross-sectional area than a typical fastener opening and, preferably, have a cross-sectional area that is greater than about 0.78 in.$^2$ and may have a cross-sectional area that is about 1.48 in.$^2$ Preferably, the total cross-sectional area for the protrusions is about 3.45 in.$^2$ Each lateral sidewall 16, 18 further includes an L-shaped cutout 30. The L-shaped cutout 30 includes a horizontal portion 32 and a vertical portion 34. The horizontal portion 32 extends to the forward edge of the left sidewall 18. That is, the horizontal portion 32 is open at the forward edge of the left sidewall 18. The horizontal portion 32 and the vertical portion 34 meet at a vertex 36. The vertical portion 34 extends downwardly from the horizontal portion 32 at the vertex 36.

The support rail and extension rail assembly 40 includes a support rail assembly 50 and an extension rail assembly 80. The support rail assembly 50 has a base plate 52 with a first, exterior surface 54 and a second, interior surface 56. The support rail assembly base plate second, interior surface 56 includes an interior surface protrusion 58. The support rail assembly base plate interior surface protrusion 58 has at least one horizontal edge 60 structured to act as a rail surface 62. In another embodiment, the support rail assembly base plate interior surface protrusion 58 at least one horizontal edge 60 includes an additional, opposing horizontal edge 61. Thus, the two horizontal edges 60, 61 define a channel 64 therebetween. As is known in the art, an electrical switching apparatus will have one or more rollers or wheels structured to roll over the rail surface 62.

The support rail assembly base plate interior surface protrusion 58 further includes an inwardly extending levering mechanism lug 66. The levering mechanism lug 66 is a rigid point to which a levering mechanism may be attached. Preferably, the levering mechanism lug 66 is a short, wide cylinder. The support rail assembly base plate interior surface 56 also includes an extension rail pivotal mounting 68. The support rail assembly extension rail pivotal mounting 68 is structured to pivotally support an extension rail 82. Preferably, the support rail assembly extension rail pivotal mounting 68 has a cylindrical body to which a trap, such as a wide, flat disk 69 may be coupled. As shown, and for the reasons set forth below, the support rail assembly extension rail pivotal mounting 68 is preferably disposed at a vertical location that is below the support rail assembly base plate interior surface protrusion rail surface 62.

The support rail assembly base plate exterior surface 54 includes a plurality of protrusions 70 structured to engage the sidewall plurality of mounting openings 25, 26, 27. That is, the support rail assembly base plate exterior surface plurality of protrusions 70 are sized, shaped, and positioned to fit snuggly within the mounting openings 25, 26, 27. In this configuration, the support rail assembly base plate 52 may be coupled to the associated lateral sidewall 16, 18 by inserting the support rail assembly base plate exterior surface plurality of protrusions 70 into the mounting openings 25, 26, 27. The support rail assembly base plate 52 may be further secured by threshold mounting fastener 220, discussed below. The support rail assembly base plate 52 includes a fastener passage 53, which in not tapped, for each threshold mounting fastener 220. The support rail assembly base plate exterior surface plurality of protrusions 70, due to their fit within the mounting openings 25, 26, 27, are structured to transfer any load applied to the support rail assembly 50 to the cassette 10. Further, the support rail assembly base plate exterior surface plurality of protrusions 70 have a limited thickness. That is, the support rail assembly base plate exterior surface plurality of protrusions 70 have a thickness that corresponds to the thickness of the associated lateral sidewall 16, 18. In this configuration, the support rail assembly base plate exterior surface plurality of protrusions 70 do not extend beyond the plane of associated lateral sidewall 16, 18.

The extension rail assembly 80 includes an extension rail 82 having an elongated body 84 with a first end 86, a medial portion 88, a second end 90, an upper rail surface 92, and an elongated slot 94 therein. The slot 94 has a first medial end 96 and a second distal end 98. The slot distal end 98 is closer to the body second end 90 than to the body medial portion 88. The extension rail 82 is pivotally coupled to the support rail assembly extension rail pivotal mounting 68. That is, the support rail assembly extension rail pivotal mounting 68 extends through the extension rail elongated slot 94. The extension rail 82 is maintained on the support rail assembly extension rail pivotal mounting 68 by the flat disk 69. The extension rail 82 further includes a lateral extension 100. The lateral extension 100 is, preferably, a cylindrical post 102 having a distal cap 104. The lateral extension 100 is sized to fit within, that is, pass through, the L-shaped cutout 30. The extension rail 82 further includes a finger notch 110. The finger notch 110 is disposed adjacent to the extension rail body first end 86. The finger notch 110 is sized to accommodate the gloved hand of a user who is wearing electrically protective gloves and, preferably, has a width of about 0.75 to 1.0 inch.

The plurality of sidewalls 12 are coupled together by a plurality of threshold mounting fasteners 220. Further, the support rail assembly base plate 52, as well as all other components 22, e.g. mounting components, insulating components, and bus assembly components, disposed within the cassette 10, are coupled to the sidewalls 12 by threshold mounting fasteners 220. Each threshold mounting fastener 220 includes a head 222 and a shaft 224 that is at least partially threaded. Preferably, the threshold mounting fasteners 220 are a self-tapping screw 223 structured to engage a non-tapped opening 200. However, if the threshold mounting fastener 220 is not a self-tapping screw 223, the associated fastener openings 202 will be tapped openings. Each sidewall 12 associated with a component 22 includes an opening 200 or fastener opening 202 aligned with a passage on an associated component 22. For example, there is a sidewall opening 200 or fastener opening 202 aligned with each support rail assembly base plate fastener passage 53. Further, the lateral sidewall 16, 18 include an opening 200 or fastener opening 202 aligned with each opening 200 on a sidewall tab long extension 208. Each threshold mounting fastener 202 is installed from within the enclosed space 14. That is, the head 222 of each threshold mounting fastener 220 is disposed within the enclosed space 14 with the shaft 224 extending toward an associated sidewall 12. The shaft 224 of the threshold mounting fastener 220 passes through the component 22, e.g., through the support rail assembly base plate fastener passage 53, and into the sidewall opening 200 or fastener opening 202.

In this configuration, no threshold mounting fastener 220 extends beyond the outer side of an associated sidewall 12. Further, as set forth above, the support rail assembly base plate exterior surface plurality of protrusions 70 do not extend beyond the plane of an associated lateral sidewall 16, 18 and the sidewall tab-like extensions 206, 208 do not extend beyond the plane of an associated lateral sidewall 16, 18. Thus, the right sidewall 16 and the left sidewall 18 are each structured to support at least one component 22 with the at least one component mounting hardware, such as, but not limited to a threshold mounting fastener 220, protrusion 70, or tab-like extensions 206, 208, extending substantially outwardly from the plane of the associated lateral sidewall 16, 18. Thus, two cassettes 10, 10A may be disposed immediately adjacent to each other. Further, in this configuration, all fastener heads 222 are disposed within the enclosed space 14, 14A and, as such, all components 22 coupled to a sidewall 12 may be removed from within the cassette 10, 10A.

While specific embodiments of the invention have been described in detail, it will be appreciated by those skilled in the art that various modifications and alternatives to those details could be developed in light of the overall teachings of the disclosure. For example, as described above the lateral sidewalls 16, 18 are shown as having slots 204 for long extensions 208 on the bottom plate 19. This configuration can be reversed with slots (not shown) on the bottom plate 19 and tabs (not shown) on the lateral sidewalls 16, 18. Accordingly, the particular arrangements disclosed are meant to be illustrative only and not limiting as to the scope of invention which is to be given the full breadth of the claims appended and any and all equivalents thereof.

What is claimed is:

1. A cassette for an electrical switching apparatus comprising:

a plurality of sidewalls coupled together to define an enclosed space, said sidewalls including a right sidewall and a left sidewall;

said right sidewall and said left sidewall each structured to support at least one component;

at least one component coupled to said right sidewall;

at least one component coupled to said left sidewall;

wherein said right sidewall does not have any mounting hardware extending substantially outwardly from the plane of the right sidewall;

wherein said left sidewall does not have any mounting hardware extending substantially outwardly from the plane of the left sidewall;

wherein:

said right and left sidewalls each have a plurality of openings therein;

said at least one component is coupled to an associated sidewall by threshold mounting fasteners;

each said threshold mounting fastener extending through said at least one component and into one said sidewall opening;

wherein:

each threshold mounting fastener has a head and a shaft;

each said threshold mounting fastener head being disposed within said enclosed space;

wherein:

said at least one component is a support rail and extension rail assembly having a pair of opposed base plates each with a exterior surface having a plurality of protrusions;

said right sidewall having a plurality of mounting openings;
said left sidewall having a plurality of mounting openings;
wherein each said base plate plurality of protrusions are structured to be disposed within said plurality of mounting openings on the associated sidewall;
wherein each protrusion within said base plate plurality of protrusions has a thickness generally corresponding to the thickness of said associated sidewall;
wherein:
said right sidewall having a slot;
said left sidewall having a slot;
said plurality of sidewalls includes a bottom sidewall, said bottom sidewall having lateral, tab-like extensions; and
said bottom sidewall extensions including at least one short extension;
said at least one short extension structured to fit within a slot and having a length in the lateral direction corresponding to the thickness of the associated sidewalls.

2. The cassette of claim 1, wherein:
said bottom sidewall has a width;
said bottom sidewall extensions including at least one long extension;
said at least one long extension bent to about a right angle at a location corresponding to the width of the bottom sidewall;
said at least one long extension having a passage therethrough; and
said bottom sidewall coupled to a lateral sidewall with a threshold mounting fastener extending through said long extension passage and into said lateral sidewall.

3. A cassette for an electrical switching apparatus comprising:
a plurality of sidewalls coupled together to define an enclosed space, said sidewalls including a right sidewall and a left sidewall;
said right sidewall and said left sidewall each structured to support at least one component;
at least one component coupled to said right sidewall;
at least one component coupled to said left sidewall;
wherein said right sidewall does not have any mounting hardware extending substantially outwardly from the plane of the right sidewall;
wherein said left sidewall does not have any mounting hardware extending substantially outwardly from the plane of the left sidewall;
wherein:
said right and left sidewalls each have a plurality of openings therein;
said at least one component is coupled to an associated sidewall by threshold mounting fasteners;
each said threshold mounting fastener extending through said at least one component and into one said sidewall opening;
wherein:
each threshold mounting fastener has a head and a shaft;
each said threshold mounting fastener head being disposed within said enclosed space;
wherein:
said at least one component is a support rail and extension rail assembly having a pair of opposed base plates each with a exterior surface having a plurality of protrusions;
said right sidewall having a plurality of mounting openings;
said left sidewall having a plurality of mounting openings;
wherein each said base plate plurality of protrusions are structured to be disposed within said plurality of mounting openings on the associated sidewall;
wherein each protrusion within said base plate plurality of protrusions has a thickness generally corresponding to the thickness of said associated sidewall;
wherein:
said plurality of sidewalls includes a bottom sidewall, said bottom sidewall having a width and lateral, tab-like extensions;
said bottom sidewall extensions including at least one long extension;
said at least one long extension bent to about a right angle at a location corresponding to the width of the bottom sidewall;
said at least one long extension having a passage therethrough; and
said bottom sidewall coupled to a lateral sidewall with a threshold mounting fastener extending through said long extension passage and into said lateral sidewall.

4. A cassette for an electrical switching apparatus comprising:
a plurality of sidewalls coupled together to define an enclosed space, said sidewalls including a right sidewall and a left sidewall;
said right sidewall and said left sidewall each structured to support at least one component;
at least one component coupled to said right sidewall;
at least one component coupled to said left sidewall;
wherein said right sidewall does not have any mounting hardware extending substantially outwardly from the plane of the right sidewall;
wherein said left sidewall does not have any mounting hardware extending substantially outwardly from the plane of the left sidewall;
wherein:
said right and left sidewalls each have a plurality of openings therein;
said at least one component is coupled to an associated sidewall by threshold mounting fasteners;
each said threshold mounting fastener extending through said at least one component and into one said sidewall opening;
wherein:
said right sidewall having a slot;
said left sidewall having a slot;
said plurality of sidewalls includes a bottom sidewall, said bottom sidewall having lateral, tab-like extensions;
said bottom sidewall extensions including at least one short extension; and
said at least one short extension structured to fit within a slot and having a length in the lateral direction corresponding to the thickness of the associated sidewalls.

5. The cassette of claim 4, wherein:
said bottom sidewall has a width;
said bottom sidewall extensions including at least one long extension;
said at least one long extension bent to about a right angle at a location corresponding to the width of the bottom sidewall;
said at least one long extension having a passage therethrough; and
said bottom sidewall coupled to a lateral sidewall with a threshold mounting fastener extending through said long extension passage and into said lateral sidewall.

6. A cassette for an electrical switching apparatus comprising:

a plurality of sidewalls coupled together to define an enclosed space, said sidewalls including a right sidewall and a left sidewall;

said right sidewall and said left sidewall each structured to support at least one component;

at least one component coupled to said right sidewall;

at least one component coupled to said left sidewall;

wherein said right sidewall does not have any mounting hardware extending substantially outwardly from the plane of the right sidewall;

wherein said left sidewall does not have any mounting hardware extending substantially outwardly from the plane of the left sidewall;

wherein:

said right and left sidewalls each have a plurality of openings therein;

said at least one component is coupled to an associated sidewall by threshold mounting fasteners;

each said threshold mounting fastener extending through said at least one component and into one said sidewall opening;

wherein:

said plurality of sidewalls includes a bottom sidewall, said bottom sidewall having a width and lateral, tab-like extensions;

said bottom sidewall extensions including at least one long extension;

said at least one long extension bent to about a right angle at a location corresponding to the width of the bottom sidewall;

said at least one long extension having a passage therethrough; and said bottom sidewall coupled to a lateral sidewall with a threshold mounting fastener extending through said long extension passage and into said lateral sidewall.

* * * * *